June 15, 1965
G. M. ROSENBERRY ETAL
3,189,814
GENERATOR COMPENSATION SYSTEM
Filed Dec. 20, 1961
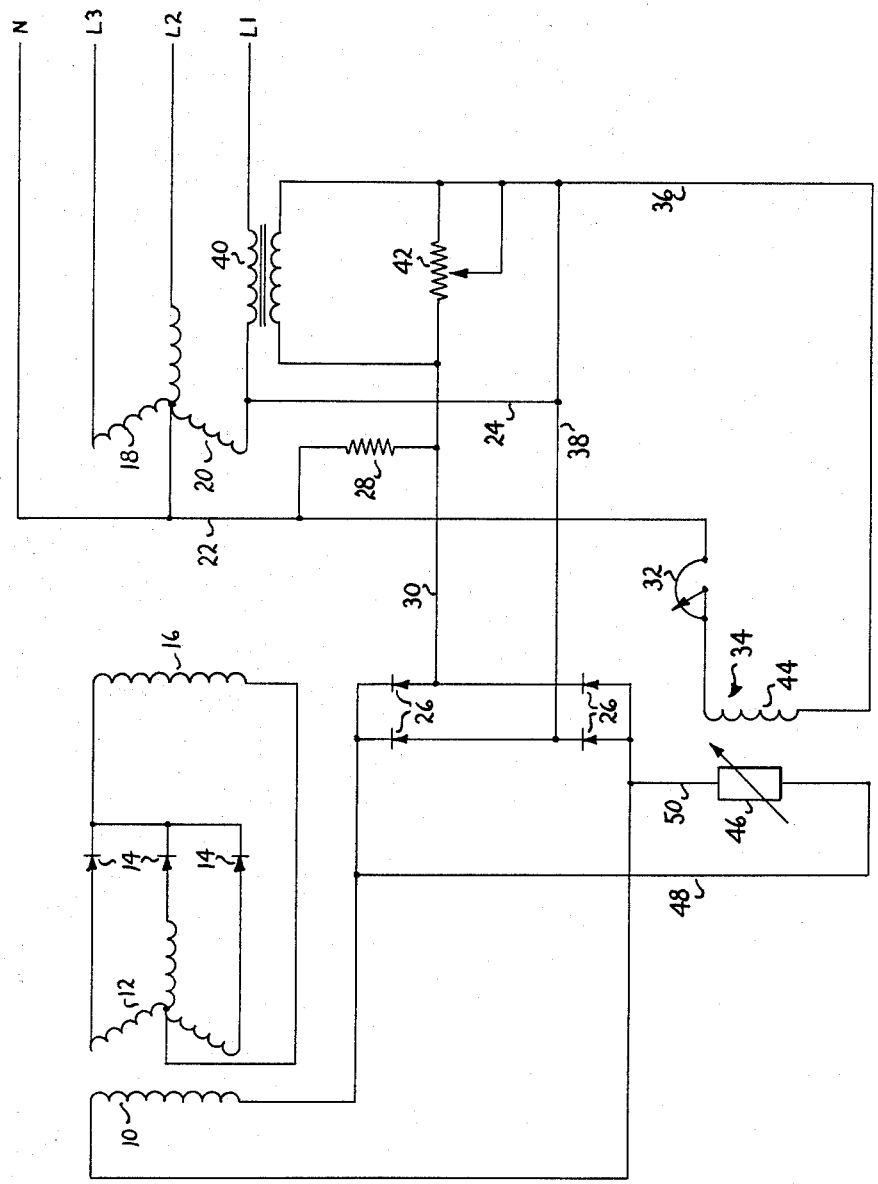
INVENTORS
GEORGE M. ROSENBERRY
THOMAS W. SALMON
BY
ATTORNEY

3,189,814
GENERATOR COMPENSATION SYSTEM
George M. Rosenberry, Schenectady, N.Y., and Thomas W. Salmon, Erie, Pa., assignors to General Electric Company, a corporation of New York
Filed Dec. 20, 1961, Ser. No. 160,755
3 Claims. (Cl. 322—25)

The invention described herein relates to a compensating system for a generator capable of providing precise control over the voltage supplied to an exciter field under all conditions of loading of the generator including short circuit faults in a connected load.

Compensation for changes in load of a conventional generator of the type having a separate exciter is obtained automatically by utilizing a feedback circuit which varies the excitation of the exciter field with changes in load voltage. In a conventional feedback arrangement, the voltage from one of three phases of the generator is rectified and applied to the exciter field through an adjustable series resistance. The amount of resistance placed in series with the field is controlled by a regulator element connected between the generator terminals and the exciter field and which senses the generator output voltage. When the load voltage being served by the generator varies, the regulator responds to the change and adjusts the series resistance to furnish the excitation necessary in the exciter field to maintain the desired output voltage from the generator.

The disadvantages of using this kind of feedback control is that the series regulating resistance must be of a size sufficient to handle the wide range of current between the no load exciter field current and the generator field current under heavy load and particularly under sustained short-circuit conditions. This means that the series regulating element must of necessity have a high power rating isnce it must handle high peak currents, but still be sufficiently sensitive or have sufficient resistance to provide control under low voltage conditions.

Moreover, a generator having this kind of control circuit cannot provide short circuit current under all conditions of operation because the voltage drop across the load is so low that no voltage is available to supply the exciter field and it therefore collapses. The generator then cannot continue to furnish short-circuit current to the load which is important in those installations where thermal circuit breakers are used in protecting the load equipment. In some cases it may take 15–20 seconds for the circuit breakers to heat to a point sufficient to isolate the load from the generating equipment rather than having breakers operate within a shorter period of time to achieve the same result.

Therefore, the types of circuits using series control elements not only are ineffective in supplying sustained high values of current to the load but also considerably high initial costs are required to be made for the control elements which comprise an important part of the generating equipment.

The primary object of our invention therefore is to eliminate the disadvantages of the prior art by providing a generator control circuit capable of providing short-circuit current under all conditions of operation.

Still another object of our invention is the provision of a compensation system for a generator capable of providing no load excitation and added excitation under load to a generator exciter field for achieving the desired performance of the generator.

In carrying out our invention we provide a compensation system for a generator which depends on feeding power in a parallel path from at least one phase in the generator armature to an exciter field. One such path includes supplying rectified phase voltage to the exciter field while the other furnishes current from a current transformer associated with the same phase when excitation is needed because of variations in the load. Trimming adjustment of the exciter field is provided by a regulator which senses the regulator line or phase voltage. Such trimming adjustment is effective in setting the no load voltage while also automatically obtaining fine adjustment of the exciter field when the generator is operating under varying load conditions.

While the specification concludes with claims particularly pointing out and distincitly claiming the subject matter which we regard as our invention, it is believed the invention will be better understood from the following description taken in connection with the accompanying drawing in which:

The single figure is a schematic showing of a generator served by a separate exciter and including a compensation system for regulating the generator output voltage.

Referring now to the drawing wherein like reference characters designate like or corresponding parts throughout the single view, there is shown a compensating system for a generator useful in providing power to a connected load, including short circuit current under all conditions of operation. The generator schematically illustrated comprises an exciter field winding 10 adapted to be mounted in a stationary stator core in the usual manner. A rotor adapted for operation in the stator includes a three-phase exciter armature winding 12 and rectifiers 14 which rectify the A.C. output and feed it to the main generator field winding 16 also mounted on the same shaft as the rotor core. As in designs of recent development, the rectifiers 14 are mounted on the rotor. The three-phase generator armature winding 18 adapted for mounting in the stator also is of conventional design and provides power to a load adapted for connection to the terminals L1, L2 and L3. N illustrates a grounded neutral.

The generator disclosed for illustrating the invention has a rating of 18.75 kva., 416 volts. The exciter no load field current is .09 amp. and full load field current .45 amp. It will be understood however that the invention has application to machines of different size and rating.

In operation, the exciter field winding 10 establishes a stationary magnetic field of unvarying magnitude in the exciter air gap. When the exciter armature is rotated, an alternating voltage is induced in the winding 12 and the output therefrom is changed to unidirectional current by the recifiers 14 and fed to the main generator field winding 16. When the latter is energized, a stationary field is established which serves to induce a voltage in the three-phases of the generator armature winding 18 which supplies power to the terminals L1, L2, and L3 adapted to connection to a load.

A compensating system useful in determining excitation of the exciter field for controlling the generator output, is connected between one phase 20 of the generator armature and the exciter field 10 for obtaining a generator output which responds instantaneously to changes in the load voltage.

The compensation system shown provides power in a parallel path from the generator armature to rectifiers which furnish unidirectional voltage and current to the exciter field. This arrangement permits setting a no load voltage in the exciter field winding while also supplying the magnitude of power necessary to obtain excitation under varying loads and short circuit conditions.

The circuit shown for accomplishing this includes a pair of leads 22 and 24 connected to at least one phase of the generator armature winding for furnishing voltage of the load to a rectifier bridge 26, which in turn provides excitation to the exciter field 10. The lead 22 includes a 250 ohm power absorbing resistor 28 which is connected to the rectifiers through lead 30. To obtain fine adjustment of the exciter field, the phase voltage also is supplied through lead 22 to an adjustable rheostat 32 and a voltage regulating element generally indicated at 34 which is more fully described hereafter. Lead 38 completes the connection to the rectifiers. The adjustable rheostat also absorbs power which permits adjusting or setting the no load voltage in the exciter field when the generator is not furnishing power to a connected load.

As the load increases on the generator, more exciter field excitation is required than can be supplied from the voltage taken from phase 20. A current transformer 40 having its primary connected to phase 20 therefore is used for adding voltage to the phase voltage provided from the generator armature. The transformer secondary includes an adjustable 250 ohm shunt resistance 42 which adjusts the current fed from the transformer and is connected to rectifiers through leads 30 and 38. The resistor 42 adjusts the current from the transformer and is in parallel with the resistor 28 which feeds the phase voltage to the rectifiers. The turns ratio for the transformer is 730:31 but it will be apparent that other ratios may be used.

To obtain a fine adjustment of voltage supplied to the exciter field for controlling the excitation to a high degree, both circuits which feed phase voltage from the generator armature and current from the transformer to the rectifiers, are connected with a shunt regulating element 34 of conventional design. The commercially available voltage regulator used in the compensation system described herein, merely consists of a coil 44 having an armature 46 which moves in such a manner as to sequentially close switches which varies the resistance in the circuit through leads 48 and 50. The amount of resistance in the circuit depends on the degree of excitation provided the coil 44. As the voltage rises in the coil, more contacts or switches close to connect more resistors across the rectifier bridge 26.

The circuit arrangement described thus far provides power in a parallel path from the transformer and the generator armature for furnishing the necessary excitation to the exciter field. The shunt connected voltage regulating element serves as a trimmer for obtaining fine adjustment of the exciter field voltage.

At no load, phase voltage is fed from the generator armature to the exciter field but part of the power is absorbed by the regulating element which is a shunt resistance to provide adjustment at no load. When a load of sufficient magnitude is placed on the generator which the phase voltage cannot handle because of the excitation requirements of the exciter, the current transformer becomes effective and adds to the voltage supplied from phase 20.

Since the voltage furnished the exciter field is dependent on the amount of resistance placed in the rectifier-exciter field circuit, it will be apparent that as the voltage rises in coil 44, a greater number of contacts close in the regulator element thereby inserting more resistors across the rectifiers. The resistors absorb more power and therefore brings the voltage back down to the desired no load setting.

In other types of compensation systems wherein control of the exciter field is dependent on a series resistor, when a short circuit occurred in the load being served, no voltage was available to supply the exciter field and it collapsed, thereby making it impossible to obtain a supply voltage at the generator terminals. The prior art generator could not provide or sustain short circuit current under these kinds of conditions. The compensating system disclosed herein eliminates this disadvantage since the current transformer can provide power to the rectifiers 26 and the shunt regulating element 34 for controlling excitation of the exciter field.

The compensation system therefore provides no load excitation which is adjusted by variable resistor 28 and added excitation under load which is controlled by the turns ratio of the current transformer 40 and the shunt resistor 42. Thus the approximate required excitation is furnished under all load conditions and without delay. Trimming adjustment is provided by the regulator which absorbs an adjustable amount of power in the regulator. This trimming power is controlled by the sensing element of the regulator which is connected to the generator phase or line voltage.

With the shunt regulating element only drawing off sufficient power to regulate the level of current, change in the current is not varied greatly and a small device therefore effectively performs the regulating function. In the event a short occurs between terminals L1 and N, the current transformer will supply excitation to sustain the short circuit current. The advantage gained is that in many installations it is desirable to have the short circuit current perform selective tripping of breakers and overload devices under both symmetrical and unsymmetrical faults. The current transformer will also supply short circuit current on a sustained basis when three-phase faults occur.

If a fault occurs between L1 and L2 or between L1 and L3, excitation will be provided from both the current transformer and from the phase voltage. Should an L2-L3 fault take place, excitation will be furnished from L1 to N, the phase voltage thereby sustaining the short circuit current under all conditions by utilizing a single current transformer.

The current transformer not only provides extra excitation when the generator is being loaded, but also permits utilizing a shunt regulating element instead of a series resistor of the type previously employed.

An additional function served by the shunt regulating element is that it can accommodate small adjustments necessary to be made in different machines, such as the heating of field windings. The adjustment is obtained automatically to obtain the desired output voltage within ±1-2%.

The advantages gained from utilizing the compensation system disclosed herein is that it provides for automatic compensation for loading without time delay, thereby obtaining extremely fast response to changes in the output voltage of the generator. Because the regulator is connected in shunt with the parallel circuits utilized in providing power to the exciter field, a smaller size voltage regulator can be used. For example, the regulator used in this invention is one-half the size of the same type of regulator previously used when connected to a series resistance control element. Also, the resistors 28 and 42 limit the peak inverse voltage on the rectifiers while simultaneously performing an adjustment function.

In view of the above, it will be apparent that many modifications and variations are possible in light of the above teachings. For example, the potential feed from one of the phases in the generator could be connected in series with the current transformer secondary instead of in parallel as disclosed. Different combinations of phase or line voltage or phase and line currents could be used to obtain accurate compensation. As indicated previously, voltage could be taken from an additional phase of the winding instead of utilizing the current transformer for providing the additional excitation to the exciter field.

The regulating element is adjustable to provide no load voltage to the exciter field but it will be apparent that other kinds of devices could be used instead of the electromechanical arrangement disclosed herein. For example, a transistor or other element capable of absorbing power could be used so long as it was capable of varying the resistance used for controlling the level of voltage furnished to the exciter field. It therefore is to be understood that within the scope of the appended claims, the invention may be practiced other than as specifically described.

What we claim as new and desire to secure by United States Letters Patent is:

1. A generator for supplying power to a load comprising an exciter including field and armature windings and rectifiers connected to the output of the exciter for furnishing unidirectional current to a generator field winding, and a generator armature winding associated with the generator field winding for supplying an alternating current at the generator terminals, a compensation system for the generator comprising a first circuit connected across a phase of the generator winding and including a resistor connected in series with a rectifier bridge, means connecting the rectifier bridge with the exciter field winding, a second circuit connected in parallel with said first circuit and including a device for taking energy from the generator winding and supplying it through an adjustable resistor to said rectifier bridge, said first and second circuits being effective in controlling the excitation of the exciter field winding at all loads, and a third circuit connected in parallel with said first two circuits and including a regulating element capable of sensing the changes in load voltage in said generator, means controlled by said regulating element for inserting resistance in the circuit between said rectifier bridge and the exciter field, thereby controlling the excitation in accordance with the output of the generator.

2. A generator for supplying power to a load comprising an exciter including field and armature windings and first rectifiers connected to the output of the exciter for furnishing unidirectional current to a generator field winding, and a generator armature winding associated with the generator field winding for providing an alternating current at its terminals, a compensation system for the generator comprising conductor leads connected at one end across one phase of the generator winding and at their other ends to second rectifiers used in providing unidirectional power to the exciter field winding, a power absorbing resistor connected in series between the generator phase winding and the second rectifiers so that the phase voltage taken from the generator winding after being rectified is supplied to the exciter field for providing a degree of excitation proportional to the voltage adapted to be supplied to a connected load, a power transformation device having its primary connected to said phase winding and its secondary including a shunt resistor connected to the rectifiers, said resistor being effective in adjusting the current from the transformation device to the second rectifiers and thereby adding to the phase voltage for increasing the excitation of the exciter field when a heavy load is being supplied by the generator, and a regulating circuit connected in parallel with the circuit providing the phase voltage and current to the second rectifiers, said regulating circuit including a device responsive to said phase voltage and said current, and means actuated by said device sensitive to the phase voltage for varying the resistance in the second rectifier-exciter field circuit and thereby providing precise control of the excitation in the exciter field winding.

3. A generator for supplying power to a connected load comprising an exciter including field and armature windings and first rectifiers connected to the output of the exciter for furnishing unidirectional current to a generator field winding, and a generator armature winding associated with the generator field winding for providing an alternating current at the generator terminals, a compensation system for the generator comprising a pair of leads connected at one end across one phase of the generator armature winding and including a series resistor between said phase and second rectifiers used for providing unidirectional power to the exciter field winding so that phase voltage taken from the generator armature winding after being rectified is capable of providing no load excitation in the exciter field winding, a current transformer having its primary connected in series with said phase of the generator winding and its secondary including a shunt resistor connected to said second rectifiers thereby permitting the application of power to the second rectifiers from the transformer for increasing the excitation in the exciter field winding to the extent necessary to satisfy the load requirements, and a voltage regulating element connected in parallel with the transformer secondary and said phase of the generator winding, said regulating element including a coil connected across said phase and thereby sensitive to changes in voltage in the generator, means controlled by said coil for inserting resistance between the second rectifiers and the exciter field winding in proportion to the phase voltage in the generator winding.

References Cited by the Examiner

UNITED STATES PATENTS

| 1,214,280 | 1/17 | Crosby | 322—25 |
| 2,210,688 | 8/40 | Schmutz | 322—25 |
| 2,913,656 | 11/59 | Bliss. | |
| 2,992,380 | 7/61 | Potter. | |
| 3,030,568 | 4/62 | Soichi Oda et al. | 322—25 |

LLOYD McCOLLUM, *Primary Examiner.*